Feb. 4, 1969     O. S. GROP     3,425,466

DEVICE FOR REFILLING THE FUEL CONTAINER OF CIGARETTE LIGHTERS

Filed March 22, 1967     Sheet 1 of 2

Inventor
Olof Sune Grop
By Cushman, Darby & Cushman
Attorneys

United States Patent Office 3,425,466
Patented Feb. 4, 1969

3,425,466
DEVICE FOR REFILLING THE FUEL CONTAINER OF CIGARETTE LIGHTERS
Olof Sune Grop, Maratonvagen 78, Enskede, Sweden
Filed Mar. 22, 1967, Ser. No. 625,076
Claims priority, application Sweden, Mar. 23, 1966, 3,809/66
U.S. Cl. 141—98         11 Claims
Int. Cl. B65b *39/00;* F16k *51/00*

ABSTRACT OF THE DISCLOSURE

This invention relates to improvements in arrangements for the refilling of the fuel container of cigarette lighters from a refill container having a protruding tude with a mouth, provided with a screw driver shaped to cooperate with a screw threaded into a hole in the fuel container, so that said stop screw can be unscrewed by means of the tube, thereby establishing a connection through a bypass interconnecting the seat of said screw with one end of the hole.

---

This invention relates to devices adapted to connect a tube, protruding from a separate fuel refill container, with the fuel container of a lighter, preferably gas lighter, at the refill of its fuel container.

An object of the invention is to provide a simple and effective device of this kind.

According to the invention the fuel container is provided with a threaded hole surrounded by a sealing seat, a stop screw threaded into said hole and pressing against said seat, a bypass for the fuel between said seat and the outer surface of the fuel container, said protruding tube being connectable to said hole at the refill of fuel and having its mouth provided with a screw driver or chisel for engaging the head of the stop screw, so that said stop screw may be turned by said chisel for establishing a communication between the two containers, and an elastic gasket surrounding the mouth of the tube for the tightening against the outer surface of the fuel container around the hole.

Figure 1:
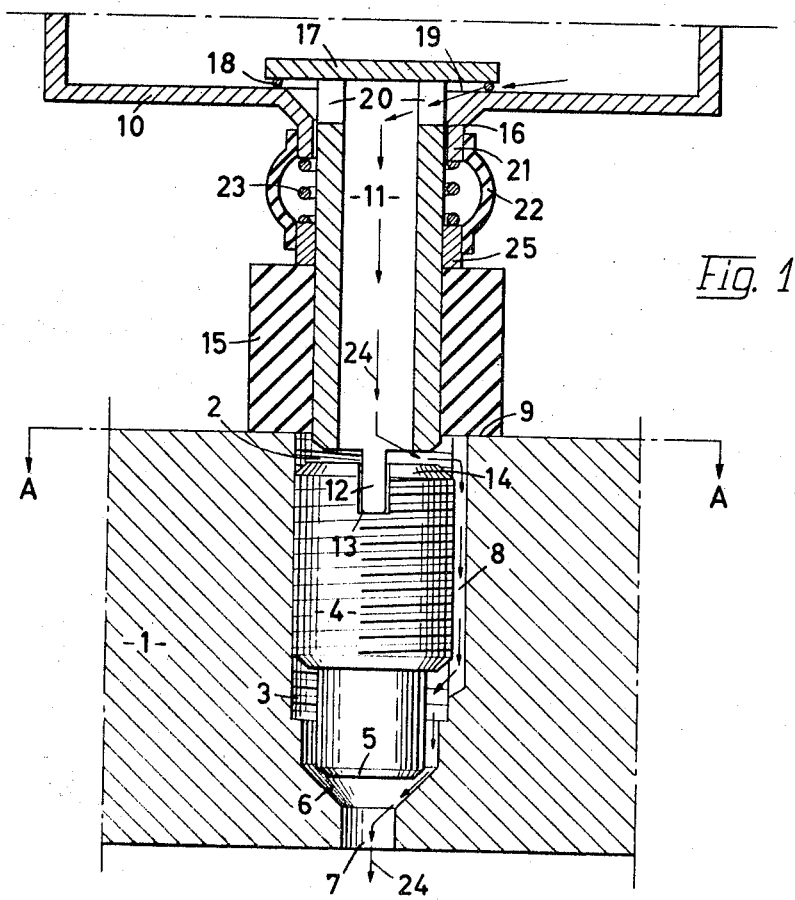
Figure 2:
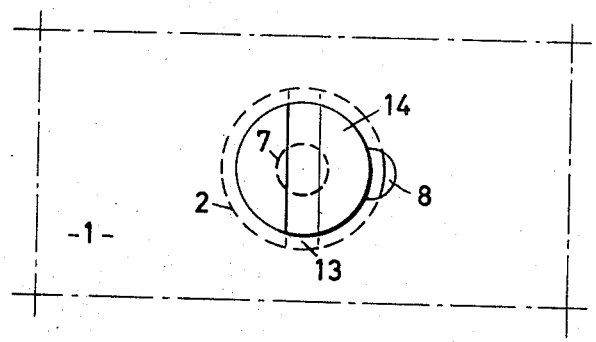
Figure 3:
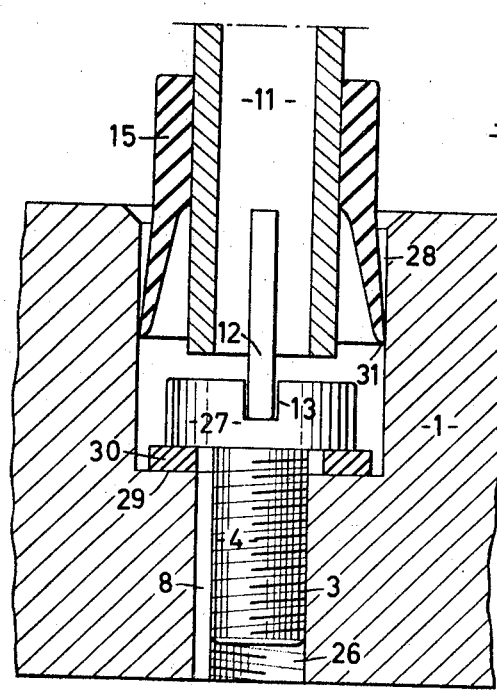
Figure 4:
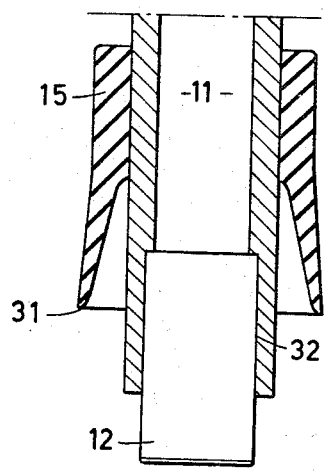

The present invention will be readily understood from the following description, reference being made to the accompanying drawings given solely by way of example and wherein:

FIG. 1 is a cross sectional view through part of a lighter as well as through a separate fuel refill container, temporarily connected to the lighter, FIG. 2 is a view of part of the lighter as seen from the line A—A in FIG. 1, FIG. 3 is a cross sectional view, corresponding to FIG. 1 but illustrating a modified embodiment of the device, and FIG. 4 is a sectional view through the portion of the tube which is located close to the mouth and the tube being turned 90° about its axis relative to the position shown in FIG. 1.

In the drawing 1 denotes on an enlarged scale a portion of the thickened bottom of a fuel container of a lighter shown upside down, but with the other parts of the lighter omitted. In the bottom there is a hole 2 with a narrow inner portion, said hole being partly provided with threads 3 allowing a stop screw 4 to be screwn in from the outside so far, that the stop screw will be a bevelled edge 5 seal against the bottom 6 of the hole, shaped as a conical seat for said edge 5 of the screw. In the middle portion of the bottom there is an opening 7 leading to the interior of the fuel container. A longitudinal channel 8 is made in the wall of the hole extending between the seat and the outer surface 9 of the fuel container as surrounding the hole. A proper sealing of the stop screw against the bottom of the hole is obtained, if plastics or a similar substance is chosen. For the same purpose a gasket (not shown) may be introduced into the hole.

The refill container 10, containing fresh fuel to be introduced into the fuel container 1 of the lighter, is provided with a protruding tube 11, which has its outer end portion surrounding the mouth shaped as a chisel 12 for the cooperation with a slot 13 of the head 14 of the stop screw.

A piece of rubber hose 15 is threaded on the tube 11 at its mouth, so that the hose may be sealingly pressed against the outer surface 9 surrounding the hole 2. The tube 11 is longitudinally movably but non-rotatably journalled in an opening 16 in the refill container 10 and provided with a valve device 17–23, known in itself and shown in the drawing, and ordinarily interrupting the connection between the container 10 and the tube. This valve device comprises a valve head 17 which forms the end of the tube 11, and is located inside the container and arranged to be sealingly pressed against a seat 19 which may be provided with an intermediate gasket 18 and surrounds the orifice of the opening 16 of the refill container 10. When the tube 11 is displaced inwards with respect to the container 10 by being pressed against the screw 4, the valve head 17 is moved inwards the container and thereby lifted from its seat 18, so that two openings 20 in the tube beneath the valve head will open inwards the container, thereby establishing a connection between the interior of the refill container 10 and that of the tube 11. Leakage through the opening 16 to the outside of the tube 11 may be prevented by a flexible sleeve 22 surrounding the tube as well as a neck 21 on the container surrounding said opening 16. A helical compression spring 23 one end of which surrounds said neck, is arranged within the socket and presses against a ring 25 threaded on and attached to the tube 11, which ring is surrounded by the lower end portion of the socket, so that said compression spring maintains the tube pressed outwards in a position in which the valve device is closed. The tube as well as the opening 16 may have an unround cross section in order to prevent unintentional rotation of the tube relative to the refill container 10.

When refilling the fuel container 1 of the gas lighter with fuel one has to engage the chisel-shaped mouthportion 12 of the tube 11 with the slot 13 in the head of the stop screw 4. Hereby the end portion of the rubber hose 15 will become pressed sealingly against the outer surface 9 of the fuel container around the hole 2. By turning the refill container 10 together with its tube 11 the stop screw will be unscrewed some turns, whereby a connection will be established through the bypass 8 between the interior of the tube 11 and the fuel container. Thereafter the refill container 10 is pressed against the fuel container, whereby the tube 11 will be moved somewhat inwards with respect to the refill container overcoming the effect of the compression spring 23. Fuel will now be transferred from the refill container 10 to the fuel container 1 of the gas lighter. In the drawing the way of the fuel is illustrated by the line 24. When a sufficient quantity of fuel has flowed over, the stop screw is tightened by rotating the refill container 10, so that the edge 5 of the stop screw becomes sealingly pressed against the bottom 6 of the hole.

In the modified embodiment shown in FIGS. 3 and 4 the chisel consists of a separate chisel blade inserted in slots 32 in the mouth of the tube 11. Alternatively, the chisel blade may be attached by welding or brazing, in which case the grooves 32 are superfluous.

In this embodiment the stop screw 4 is screwed into a narrow and threaded lower portion 26 of the hole, whereby the head 27 of the screw together with an intermediate sealing gasket 30 can be pressed against a shoulder 29 formed between the said narrow portion and upper wide portion 28 of the hole. Said shoulder is located at such a depth in the hole, that the screw will be countersunk to such an extent, that also the gasket 15, surrounding the lower portion of the tube 11, will be inserted in the hole with its lower edge sealingly abutting against the wide portion of the hole, when the tube 11 is inserted into the hole.

The sealing will be better and the insertion of the gasket 15 in the hole facilitated, when the gasket has been given a cup-shape near its lower edge 31 as shown in FIGS. 3 and 4.

As is shown in FIGS. 3 and 4, the gasket 15, surrounding the tube 11, may be displaceable along the tube in order to facilitate the insertion of the chisel in the slot of the screw.

Lastly, it is obvious that the invention is not limited to the embodiments described above by way of example but covers, on the contrary, any modifications falling within the scope of the following claims.

What I claim is:

1. Arrangement for the refilling of cigarette lighters comprising in combination:
    (A) a cigarette lighter having a fuel container (1), a threaded hole (2) interconnecting the interior of said container with the outer surface of said lighter, a valve seat (6, 29) in said hole, a screw (4) threaded into said hole and sealingly pressing against said seat in a gas tight manner in its normal position; and
    (B) a refill container (10) having a protruding tube (11) cooperating with said hole when the lighter is being refilled, characterized by the provision of
        (a) a fluid bypass (8) which interconnects said valve seat (6, 29) with one end of said hole (2), and through which fuel may flow into said container (1) when said screw (4) is disengaged from its valve seat by being partly unscrewed,
        (b) an unround recess (13) in the outer end surface of said screw,
        (c) a projection (12) which is provided at the outer end of said protruding tube (11) and has a shape corresponding to that of said unround recess for engaging same and permitting unscrewing of said screw by means of said tube, and
        (d) an elastic gasket (15) which sealingly interconnects the outer end of said tube with the outer end of said hole, when the projection of said tube is in engagement with the recess of said screw.

2. Arrangement as claimed in claim 1, characterized in that said bypass consists of a longitudinal channel (8) in the threaded wall of said hole (2).

3. Arrangement as claimed in claim 1, characterized by a second gasket (30) which is located in said hole (2) and cooperates with the screw (4).

4. Arrangement as claimed in claim 1, characterized in that the firstmentioned gasket (15) surrounds the mouth of said tube (11) and consists of a rubber hose, which is threaded on said tube.

5. Arrangement as claimed in claim 1, characterized in that said tube (11) is non-rotatably attached to the refill container (10).

6. Arrangement as claimed in claim 1, characterized in that the tube (11) is longitudinally displaceable in the refill container (10), and carries a valve device (17–19) opening at inwards displacement of the tube, thereby establishing a connection between the tube and the interior of the refill container.

7. Arrangement as claimed in claim 1, characterized in that said hole (2) comprises an inner, narrow portion (7), an outer, threaded, wide portion, and a conically widening shoulder (6), which interconnects said narrow portion of the hole with said wide portion thereof and forms said valve seat, against which the inner end (5) of said screw (4) sealingly abuts in its normal position.

8. Arrangement as claimed in claim 1, characterized in that said screw has a head (27), and in that said hole comprises a threaded, inner, narrow portion (26) for receiving the threaded portion of said screw (4), an outer, wide portion and a shoulder (29) which interconnects said wide portion of the hole with the inner, narrow portion thereof and forms said valve seat, against which said screw head sealingly abuts in its normal position.

9. Arrangement as claimed in claim 8, characterized in that said gasket (15) surrounding the free end of said tube (11) is insertable in said outer, wide portion (28) of the hole and sealingly engages the circumference of said hole.

10. Arrangement as claimed in claim 9, characterized in that said gasket (15) surrounding the free end of the tube (11) has a cup-shaped portion insertable in said hole.

11. Arrangement as claimed in claim 1, characterized in that the projection of said protruding tube (11) is a screw-driver edge (12), and in that said recess in the screw end is a slot (13) for receiving said screw-driver edge (12).

References Cited

UNITED STATES PATENTS

| | | | |
|---|---|---|---|
| 1,738,437 | 12/1929 | Langdon | 251—152X |
| 1,792,945 | 2/1931 | Van Deyenter | 251—152X |
| 3,191,641 | 6/1965 | Maltner | 142—98 |
| 3,213,649 | 10/1965 | Sakamoto | 431—344 |

HOUSTON S. BELL, JR., *Primary Examiner.*

U.S. Cl. X.R.

251—152; 141—349